(12) United States Patent
Hansmann et al.

(10) Patent No.: US 11,307,959 B2
(45) Date of Patent: Apr. 19, 2022

(54) CORRELATING LOGS FROM MULTIPLE SOURCES BASED ON LOG CONTENT

(71) Applicant: INTERNATIONAL BUSINESS MACHINES CORPORATION, Armonk, NY (US)

(72) Inventors: Uwe K. Hansmann, Tuebingen (DE); Klaus Rindtorff, Weil im Schoenbuch (DE); Daniel Blum, Stuttgart (DE); Timo Kussmaul, Boeblingen (DE); Thomas Steinheber, Maihingen (DE)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 16/416,557

(22) Filed: May 20, 2019

(65) Prior Publication Data

US 2020/0371897 A1 Nov. 26, 2020

(51) Int. Cl.
*G06F 11/34* (2006.01)
*G06F 17/15* (2006.01)
*G06K 9/62* (2022.01)
*G06N 20/00* (2019.01)

(52) U.S. Cl.
CPC .......... *G06F 11/3476* (2013.01); *G06F 17/15* (2013.01); *G06K 9/6267* (2013.01); *G06N 20/00* (2019.01)

(58) Field of Classification Search
CPC ..... G06F 11/3476; G06F 17/15; G06N 20/00; G06N 3/08; G06K 9/6267
See application file for complete search history.

(56) References Cited

U.S. PATENT DOCUMENTS

| 9,063,980 | B2 | 6/2015 | Dhamankar |
| 9,471,474 | B2 | 10/2016 | Gurumurthy |
| 9,665,420 | B2 * | 5/2017 | Jilani .................. H04L 41/0631 |
| 9,917,853 | B2 | 3/2018 | Seigel |
| 9,940,373 | B2 * | 4/2018 | Russell ................ G06F 40/205 |
| 2015/0067171 | A1 | 3/2015 | Yum |

(Continued)

OTHER PUBLICATIONS

Alobaidli, et al., "Challenges of Cloud Log Forensics", ACM SE '17 Proceedings of the SouthEast Conference, Published: Apr. 13, 2017, pp. 227-230, ACM, New York, [Digitial Object Identifier: 10.1145/3077286.3077302].

(Continued)

*Primary Examiner* — Nadeem Iqbal
(74) *Attorney, Agent, or Firm* — Steven M. Bouknight (57) ABSTRACT

A computer-implemented method for consolidating log file entries may be provided. The method comprises receiving a first log file and a second log file, determining a first characterizing feature set of a first log file entry of the first log file and a second characterizing feature set of a second log file entry of the second log file, and determining a correlation factor value of a correlation between the first log file entry and the second log file entry by classifying a relationship of the first log file entry and the second log file entry using the characterizing feature sets. The method further comprises upon determining that the correlation factor value is above a predetermined correlation factor threshold value, determining that the first log file entry and the second log file entry relate to each other and belong to a same action flow.

20 Claims, 5 Drawing Sheets

(56) References Cited

U.S. PATENT DOCUMENTS

2016/0292592 A1   10/2016   Patthak
2016/0301561 A1   10/2016   Petersen
2017/0244748 A1    8/2017   Krause
2018/0129579 A1*   5/2018   Debnath ............. G06F 11/3065

OTHER PUBLICATIONS

Alqahtany, et al., "A forensic acquisition and analysis system for IaaS", Cluster Comput, First online: Nov. 25, 2015, pp. 439-453, Mar. 2016, vol. 19, Issue 1, Springer Science+Business Media, New York, [Digital Object Identifier: 10.1007/s10586-015-0509-x].

Likhita, et al., "Log Management In Cloud Through Big Data", International Journal of Advance Computing Technique and Applications, Jun. 2016, pp. 198-204, vol. 4, Issue 1, Sreenidhi College of Engineering and Technology, [ISSN: 2321-4546].

Pichan, et al., "Cloud forensics: Technical challenges, solutions and comparative analysis", Digital Investigation, Available online: Apr. 14, 2015, pp. 38-57, vol. 13, Department of Computing, Curtin University, Kent Street, Bentley, Perth, WA 6102, Australia, [Retrieved online: https://doi.org/10.1016/j.diin.2015.03.002].

* cited by examiner

CORRELATING LOGS FROM MULTIPLE SOURCES BASED ON LOG CONTENT

FIELD OF THE INVENTION

The invention relates generally to a method of managing log files, and more specifically, to a computer-implemented method for consolidating log file entries. The invention relates further to a related log consolidation engine system for a consolidation of log file entries, and a computer program product.

BACKGROUND

Today's cloud computing software solutions are typically not built from scratch as one stack, but are using and rely on a set of different already existing solutions, services or micro-services, potentially from a variety of different sources such as software vendors, service providers and/or application platforms. Many of such services are available as pre-built service solutions (e.g., SaaS—software as a service) which may be used by solution or application developers which integrate such services from different sources together with databases, notification systems and communication components using a service-oriented architecture (SOA). Typically, each of the components—i.e., the services—may write log information into their own logging infrastructure in addition to the logging infrastructure that the software development teams run that built the solutions using the pre-built existing services.

SUMMARY

According to one aspect of the present invention, a computer-implemented method for consolidating log file entries may be provided. The method may comprise receiving a first log file and a second log file, determining a first characterizing feature set of a first log file entry of the first log file and a second characterizing feature set of a second log file entry of the second log file, and determining a correlation factor value of a correlation between the first log file entry and the second log file entry by classifying a relationship of the first log file entry and the second log file entry using the characterizing feature sets.

Additionally, the method may comprise, in response to determining that the correlation factor value is above a predetermined correlation factor threshold value, determining that the first log file entry and the second log file entry relate to each other and belong to a same action flow.

According to another aspect of the present invention, a log consolidation engine system for a consolidation of log file entries may be provided. The system may comprise a receiving unit that receives a first log file and a second log file, a first determination unit that determines a first characterizing feature set of a first log file entry of the first log file and a second characterizing feature set of a second log file entry of the second log file, and a second determination unit that determines a correlation factor value of a correlation between the first log file entry and the second log file entry by classifying a similarity of the first log file entry and the second log file entry using the characterizing feature sets. Thereby, the second determination unit may also, in response to determining that the correlation factor value is above a predetermined correlation factor threshold value, determine that the first log file entry and the second log file entry relate to each other and belong to a same action flow.

As previously described with respect to cloud computing components, each of the services may typically write log information into their own logging infrastructure in addition to the logging infrastructure that the software development teams run that built the solutions. As all of the logs from those different systems are written to potentially different logging systems, it may be extremely difficult or impossible to get a complete view on what happened in all parts of a complete system in case a user experiences difficulties with the function of the application program. In these cases, the development teams need an understanding about the sequence of the services what kind of activities happened in the sequence. It may also be understood that the different logging systems have their own and different identifiers—such as request identifiers, tenant identifiers, activity identifiers, and so on—making it practically impossible to correlate data in different log files of the different frameworks even if access to each of the logging systems in a complete SaaS solution may exist. Furthermore, another disadvantage of known solutions may be that only simple log entry field comparisons—e.g., log entry time—are used in order to relate different log entries. Thus, there may be a need to overcome the limitations of existing solutions, in particular, providing a sophisticated cross log and cross logging infrastructure and logging framework relationships between log entries.

The proposed computer-implemented method for consolidating log file entries may offer multiple advantages and technical effects:

Developers are enabled to reconstruct an activity flow of different services or micro-services within a service-oriented architecture framework even if the involved services or micro-services do not originate from the same framework and thus may not use the same logging mechanisms.

The proposed method and system may be able to support a reconstruction of a sequence of services called or activated based on their individual locking information in order to build individual action flows. For this, log files of different logging systems may be analyzed and a characterizing feature set of individual log entries may be determined. This step may be instrumental for differentiating different log entries in the same log file because they may vary depending on the service or depending on the activity activated during a service call. This step may also be performed for log file entries of different log files—potentially from different logging infrastructures.

A correlation value between the different log file entries of the different log files may be determined in order to define—in particular depending on exceeding a threshold value—that the different log file entries relate to each other and relate to a certain activity flow.

This may enable grouping the log file entries and the related service activations in order to reconstruct an activity flow of interactions of a user with a software application. This may enable developers and system analysts—e.g., in the field of computer forensics—to reconstruct user activities across multiple systems, computing frameworks, components of different service providers and underlying logging infrastructure services.

For a proper relationship building/determination of log file entries, a simple comparison of fields of log file entries is not sufficient (e.g., time-wise relation or user ID identity). However, this may be used as an additional check point for the proposed method and system. On the other hand, the focus of the proposed method goes further and involves a determination of a relationship between log file entries of the same and/or different log infrastructures and may require a match analysis in the context of all—or all relevant—features or characterizing features of the log file entries in question. A user ID identity may be a strong hint in determining a relationship but only if the related log entry timestamps are pretty close to each other (i.e. in a time window depending on the type of application). The type of application may be derivable from the type of involved services having initiated the related log entries typically defining consecutive steps of a known workflow in order to conclude that the two log file entries are likely to be related.

In the following, additional embodiments of the inventive concept—applicable to the method as well as to the related system—will be described.

According to one preferred embodiment of the method, the characterizing feature set may comprise data relating to the group comprising at least one of or a combination of a timestamp of an entry in a log file, a log entry origin identifier, a log entry target identifier, a log entry purpose value, user information—in particular at least a user identifier—content data, a network address—e.g., an IP address (Internet Protocol)—a log origin importance value (e.g., premium, non-premium), and a log request identifier. The log entry request identifier, which may be an alphanumerical value, may be generated by the service having initiated the log request, or alternatively, a constantly growing identifier value generated by a log entry management system, in order to better differentiate different log file entries. Generally, a log file entry or log file record may comprise any information characterizing the activity of a service having initiated the log request.

According to one embodiment of the method, the first log file and the second log file may relate to different service programming and/or service executing frameworks. The same may apply to micro-services. Consequently, the first log file and the second log file may have different formats, different naming conventions, different value ranges for log record entries, etc. Basically, it may be difficult or even impossible, to compare them directly by a simple field-by-field comparison, as tried by traditional approaches.

According to one preferred embodiment of the method, the classifying of the relationship of the first log file entry and the second log file entry may be performed by a first machine-learning system (ML system) trained for a determination of a model for a classification of log file entries. Such a trained ML-based system may have—in a trained status—the required amount of flexibility and adaptability to compare and classify log entries—i.e., log records—from different log systems or log frameworks. A new log system for consolidation may be integrated into the proposed method by a new training run with new annotated log file entries in order to also consolidate a new type of log file system. No new configuration or reprogramming of the related log consolidation engine system may be required.

According to another embodiment of the method, for at least a subset of corresponding features of the characterizing feature sets of the first log entry and the second log entry, a numerical score value may be determined. This may require that the different features in the different log file entries may be expressed as a numerical value. For some of the fields or features of a log entry—e.g., for a calling service identifier, a user ID (identifier) or the number of times the service was activated in a predefined time—this may be relatively straightforward. However, for other characterizing features of the log entry—e.g., for content data—such a comparison may be more complex. For this, a Hamming distance or a Levenshtein distance value may be used as numerical values to compare content data fields of a log entry. In other cases, a simple comparison of corresponding fields of different log entries may be performed in order to determine that the corresponding fields are identical or not identical and express this fact as "0" or "1" (match/non-match).

According to another embodiment, the method may also comprise determining the correlation factor value by determining a difference between a weighted sum of the feature values—in particular the numerical score values—of the first log entry and a weighted sum of the feature values of the second log entry of the subset of corresponding features. These two sums may then be compared in order to determine the correlation factor. If the numerical score values and the weighing factors are chosen and predefined by a system user, depending upon the underlying log file infrastructure, a reliable correlation factor value may be derivable.

According to another embodiment, the method may also comprise training a second machine-learning system for generating a model for determining tags, each tag characterizing a log file entry of the first log file and/or the second log file based on a usability factor for each feature of a log file entry. Such an assessment and/or classification of the different features—i.e., subcomponents of the relevant log entry record—may allow a determination on whether to use certain log file entry fields that are not in a given comparison/assessment in view of another log file entry from another log file system. Thus, the second machine learning system may generate adaptable models that are instrumental in determining a subset of features of the log file entries from different log file systems to be compared.

According to further embodiments of the method, the action flow may be a sequence of correlated services that are activated and that have a contextual correlation. The action flow data (e.g. sequence of activities and service calls) associated with the action flow may be combined in one or more action flow files in order to display in a graphical user interface to a system analyst the way in which a given software application has been used. The method may also comprise generating a result log comprising the first log file entries and the second log file entries relating to each other and belonging to the same action flow. This may be helpful in computer forensics or in order to debug a more or less complex service-oriented architecture (SOA)-based application.

According to another embodiment, the method may also comprise extracting the content data from a log entry, requesting an originating requestor identifier from a plurality of search engines—i.e. publicly accessible search engines—for a predefined time window close to or surrounding the log entry that the content data relates to, and building a universal request identifier relating to those log file entries for which the content data and the originating requestor identifiers match, respectively. Thus, if search requests have been initiated to one or more search engines (identical or different) by the same or different services (or micro-services) using the same, or also related, expressions as search terms in a given period of time, the proposed system may be enabled to correlate these search engine calls using the universal request identifier.

According to an additional embodiment—e.g., based on the previous one—of the method, the determination of the correlation factor value may be based in part on a function of the universal request identifier indicating a relationship between related log file entries. Thus, an external storage unit—as used for an external search engine—may be used to determine the correlation factor value between log file entries of different log systems.

Furthermore, embodiments may take the form of a related computer program product, accessible from a computer-usable or computer-readable medium providing program code for use by, or in connection with, a computer or any instruction execution system. For the purpose of this description, a computer-usable or computer-readable medium may be an apparatus that may contain means for storing, communicating, propagating or transporting the program for use by, or in connection with, the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'log file entry' may denote a structured or semi-structured record for storing activities of services or micro-services in a log file. It may not be required that each record of the log file has an identical structure. Different log files may exist for different services or micro-services. They may belong to different logging infrastructures. They may even be stored on different computing systems.

The term 'characterizing feature' may denote a field, a group of fields or a sub-field of a log file entry in a log file. The characterizing features and their dependencies may be used to determine a correlation factor value between different log file entries in different log files of different log file systems and log infrastructures.

The term 'correlation factor value' may denote a strength of a relationship between different log file entries of different log files. The correlation factor value may be expressed as a numerical value which may be compared against a correlation factor threshold value. If the correlation factor value is above the predefined correlation factor threshold value, it may be determined or defined that two log file entries of different log files may relate to each other. Such a relation may express that they belong to a same action flow of activities triggered by an interaction of a user with an application program.

The term 'classifying' may denote the activity of grouping events, or input data, to certain predefined groups, or classes, as output data. Such classification tasks may be performed by machine learning (ML)-based systems. Such systems are often neural networks or deep neural networks. However, other classifiers may also be used for a classification of a difference between different log file entries.

The term 'action flow' may denote a sequence of services or micro-services that are called, or activities triggered by these services or micro-services that may relate to the same user activities of an application program. However, not only application programs may be analyzed but also machine control software, like operation software for IoT systems (Internet of Things) may be supervised and are analyzed for programming, debugging or computer forensic activities.

The term 'machine-learning system'—or the related term 'machine-learning algorithm'—may denote a system trained for deriving output data based on input data. The training of the system may be performed using training data such that parameters, and also hyper-parameters, are determined during a training session for deriving a model which is used for deriving the output data on unknown input data. Often, machine learning systems are implemented as neuronal networks with an input layer of artificial neurons, one or more hidden layers of artificial neurons, and an output layer. Typically, each neuron of a layer may be connected via an edge with a weighing factor to each of the neurons of a subsequence layer. Each artificial neuron may be characterized by an activation function and/or an activation value. The deriving of the model during the training phase may be performed through a back-propagation of signals derived from a cost function at the output layer. With this setup, unknown input data may also be classified after the training. It may not be required that new, unknown input data match one of the examples of the training data set in order to derive a meaningful output. In addition to a class derived at an output value, a probability value that the input data are correctly classified into the class determined as output value may also be output by such a system.

In the following, a detailed description of the figures will be given. All instructions in the figures are schematic. Firstly, a block diagram of an embodiment of the inventive computer-implemented method for consolidating log file entries is given. Afterwards, further embodiments, as well as embodiments of the log consolidation engine system for a consolidation of log file entries, will be described.

Figure 1:
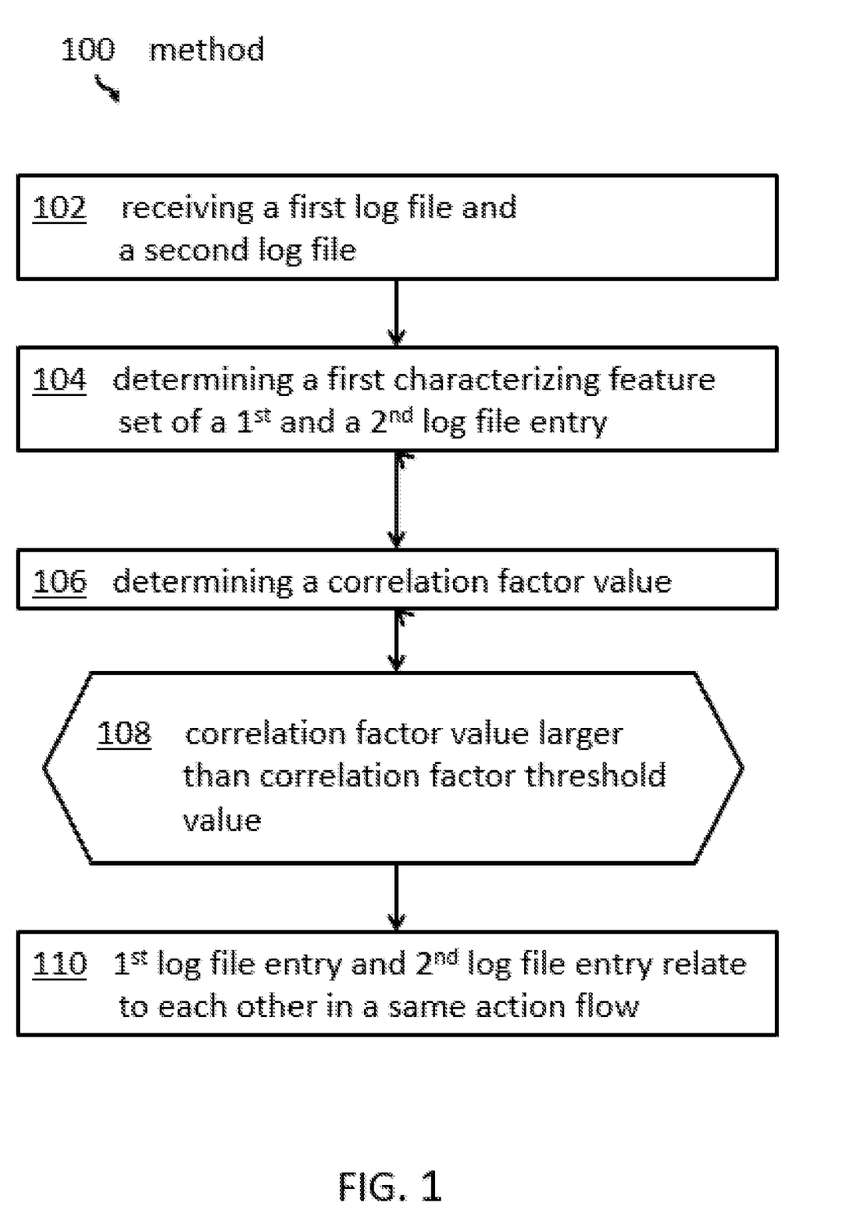
FIG. 1 shows a block diagram of an embodiment of the inventive computer-implemented method for consolidating log file entries.

FIG. 1 shows a block diagram of an embodiment of the method 100 for consolidating log file entries. The method 100 comprises receiving at 102 a first log file and a second log file, which may also be more than only two log files. Thus, the proposed mehod may be operational with a plurality of different log files in different formats and being part of different log file frameworks.

The method 100 comprises also determining at 104 a first characterizing feature set of a first log file entry of the first log file and a second characterizing feature set of a second log file entry of the second log file, and determining at 106 a correlation factor value of a correlation between the first log file entry and the second log file entry by classifying a relationship of the first log file entry and the second log file entry using the characterizing feature set.

Furthermore, the method 100 comprises a determination at 108 whether the correlation factor value is above a predetermined correlation factor threshold value, and in response to the correlation factor value being above the predetermined correlation factor threshold value, determining at 110 that the first log file entry and the second log file entry relate to each other and belong to a same action flow.

Figure 2:
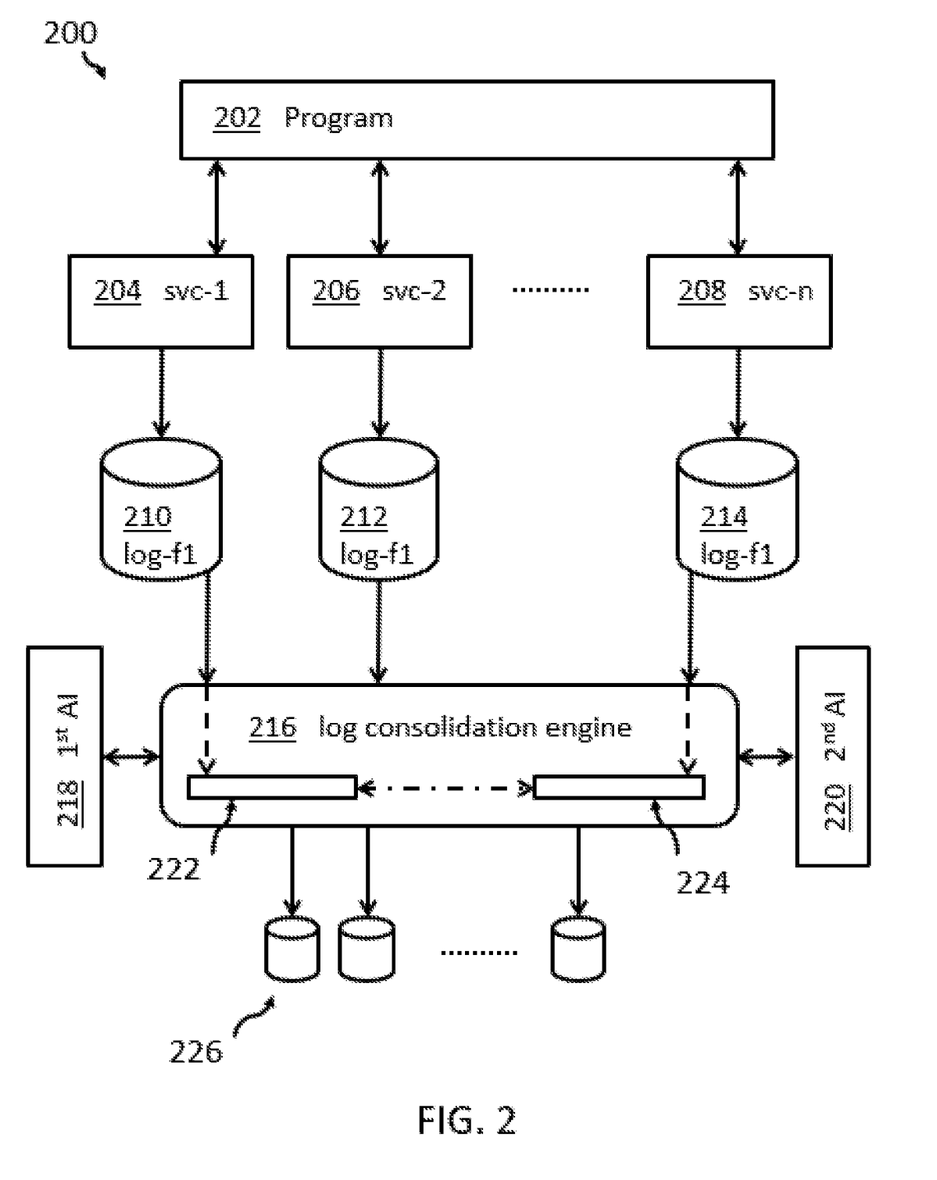
FIG. 2 shows a block diagram of an embodiment of an architectural setup of components being instrumental for the proposed concept.

FIG. 2 shows a block diagram of an embodiment of an architectural setup 200 of components for the proposed method. A program 202 may—beside others—be composed of a plurality of services, svc-1 204, svc-2 206, ..., svc-n 208. The services may use different log files log-f1 210, log-f2 212, ..., log-fn 214. The services or micro-services 204, 206, 208 may belong to different development frameworks and thus write there log file entries to different log files 210, 212, ..., 214 being organized differently and potentially belonging to different logging infrastructures.

The log consolidation engine 216 can be used to correlate different log file entries from different log files 210, 212, ..., 214 in order to reconstruct action flows 226 of different activation sequences of services 204, 206, ..., 208 of an application program 202 in order to support programming activities, debugging activities or computer forensic activities. The log consolidation engine 216 may be supported by a first and a second ML-based system ($1^{st}$ AI, $2^{nd}$ AI) 218, 220 in order to determine the correlation—illustrated as horizontal double arrow between different log file entries 222, 224 of different log files, e.g., log file 210 and log file 214.

The determination of a correlation factor value may either be performed in a semi-dynamic way in which a weighted sum of numerical values of characterizing features of different log file entries may be used. Thereby, it may be assumed that the numerical values of different fields of the log file entries are directly or indirectly comparable. In some cases it may only be determinable that fields match, inexpressible by "0" or "1" (match/no-match), and in other cases a content comparison of the fields of the log file entries may be possible. For example, user IDs (identifiers) may be compared directly, whereas IP addresses (Internet Protocol) or other network addresses may be more difficult to compare. In such cases, a comparison of subnets may be used to determine whether there may be a correlation between different log file entries (e.g., usage of the same sub-net).

Figure 3:
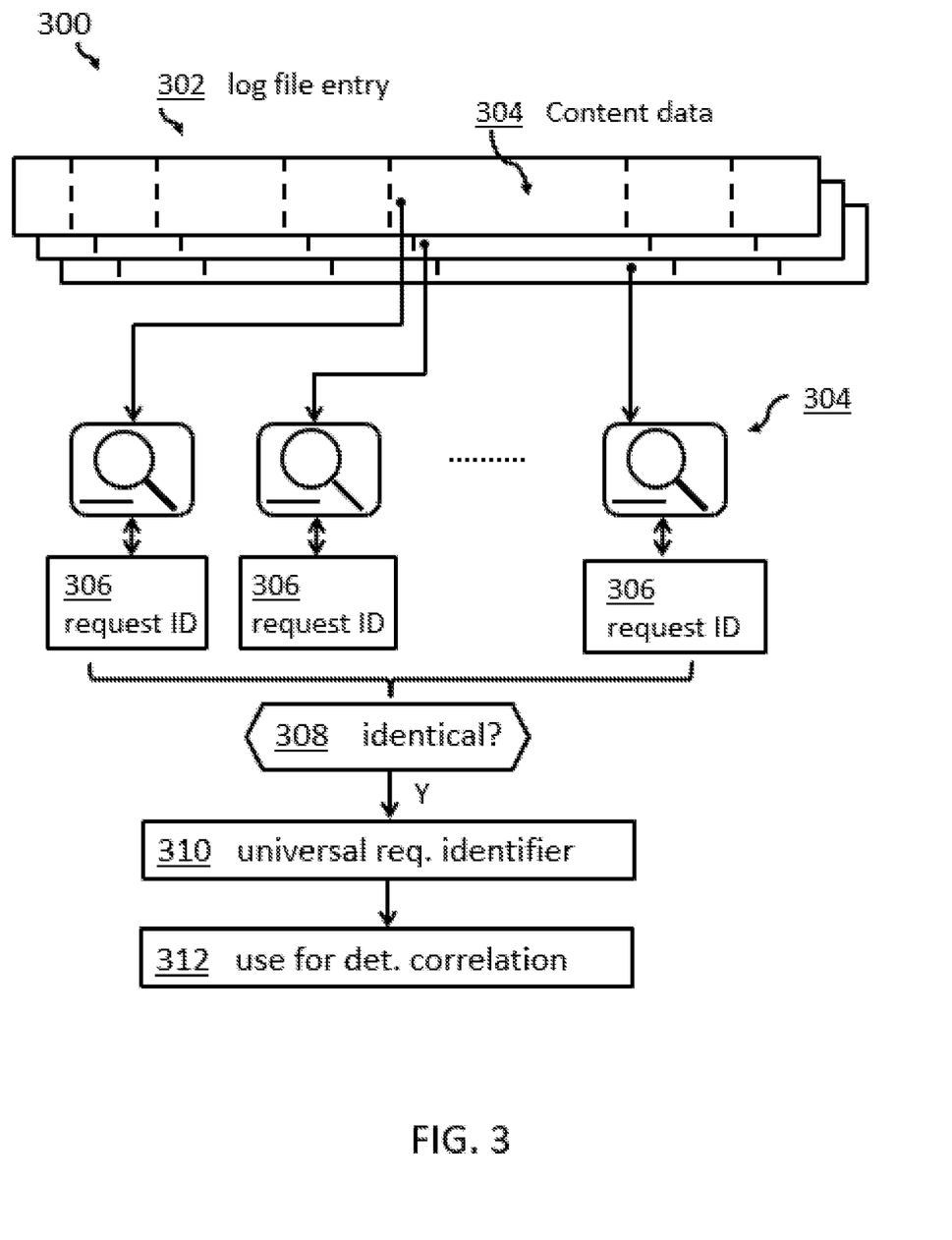
FIG. 3 shows a block diagram of an embodiment of components instrumental for dealing with content data as part of log file entries.

FIG. 3 shows a block diagram of an embodiment 300 of components for dealing with content data as part of log entries. The figure shows log file entries 302 as log file records. Different fields of the log file entries 302 are symbolically shown as separated fields by vertical dashed lines.

A content data field 304 is shown in all log file entries 302. Content data are often used by services (not shown here), having generated a specific log file entry 302, as search terms for one or more search engines 304. If the same or similar search term may have been used in a predefined time window around the generation time of the log file entry 302, there may be a certain possibility that for these service calls, and thus the related log file entries 302, the log file entries may be correlated.

In order to determine such a correlation, the log consolidation engine 216 (see FIG. 2) may request a request ID (identifier) 306 from one or more search engines 304 for the relevant search terms in a predefined time window and compare them in order to determine whether they are related at 308. The comparison leads to a related determination of the probability factor value that the two entries in question originate from two consecutive actions from one flow of actions. If that is the case, a universal request identifier 310 may be determined in order to support a determination of a correlation of the different log file entries 302 having used the same or a similar search term for different search engines 304. This may be instrumental—e.g., used as another input and parameter—for a determination of a correlation factor value.

Figure 4:
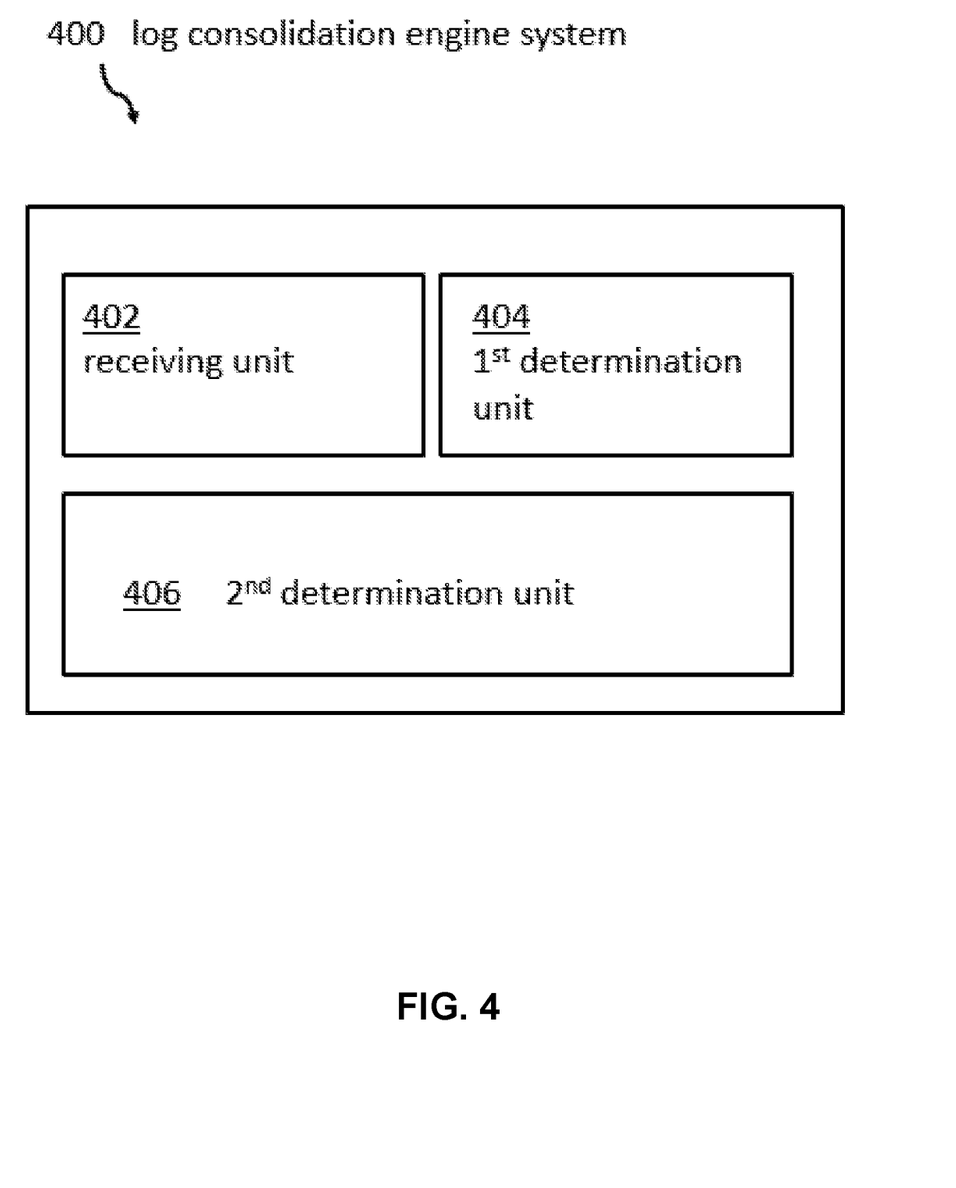
FIG. 4 shows a block diagram of an embodiment of the log consolidation engine system.

FIG. 4 shows a block diagram of an embodiment of the log consolidation engine system 400. The system comprises a receiving unit 402 that receives a first log file and a second log file, a first determination unit 404 that determines a first characterizing feature set of a first log file entry of the first log file and a second characterizing feature set of a second log file entry of the second log file, and a second determination unit 406 that determines a correlation factor value of a correlation between the first log file entry and the second log file entry by a classification of a relationship—which may be expressed in a similarity—of the first log file entry and the second log file entry using the characterizing feature set. As such, and as previously described, log files of different logging systems may be analyzed and a characterizing feature set of individual log entries may be determined.

Thereby, the second determination unit 406 may also, in response to determining that the correlation factor value is above a predetermined correlation factor threshold value, determine that the first log file entry and the second log file entry relate to each other and belong to a same action flow.

Furthermore, the second determination unit 406 may, based on the determination that the first log file entry and the second log file entry relate to each other and belong to the same action flow, consolidate the first log file entry and the second log file entry into the same action flow as well as reconstruct an action flow sequence for the same action flow based on the first log file entry and the second log file entry. As previously described, the present invention may reconstruct an activity flow of different services or micro-services within a service-oriented architecture framework even if the involved services or micro-services do not originate from the same framework and thus may not use the same logging mechanisms. Based on the determination that said first log file entry and said second log file entry relate to each other and belong to the same action flow, the second determination unit 406 may reconstruct a sequence of services called or activated (i.e. the first and second log entries) based on their individual locking information in order to build/reconstruct action flows. Specifically, for example, the second determination unit 406 may reconstruct a sequence of services called or activated by determining in which order the first and second log entries, along with any additional log entries, are called and/or activated.

Figure 5:
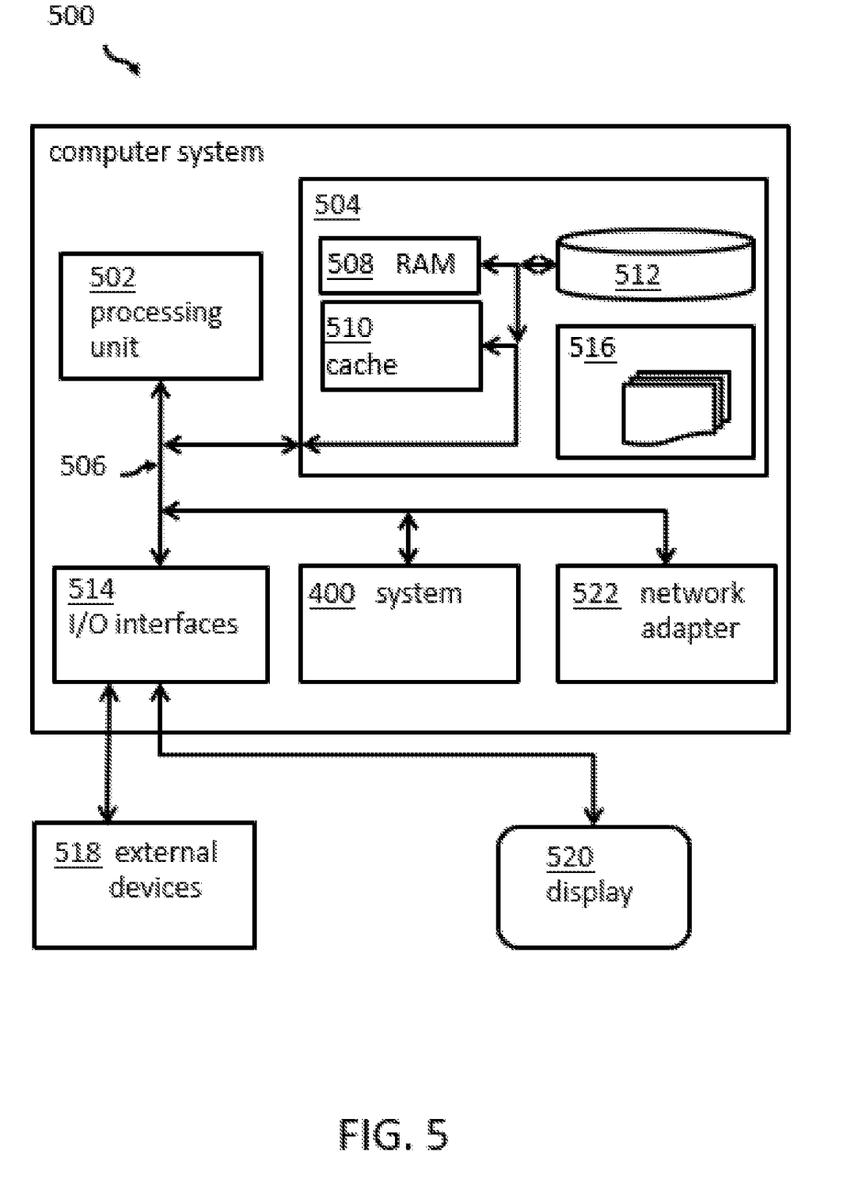
FIG. 5 shows an embodiment of a computing system comprising the log consolidation engine system.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth herein-above. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the log consolidation engine system 400 for a consolidation of log file entries may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for correlating log file entries, said method comprising:
   receiving a first log file and a second log file;
   determining a first characterizing feature set of a first log file entry of said first log file and a second characterizing feature set of a second log file entry of said second log file;
   determining a correlation factor value of a correlation between said first log file entry and said second log file entry by classifying a relationship of said first log file entry and said second log file entry using characterizing feature sets;
   in response to determining that said correlation factor value is above a predetermined correlation factor threshold value, determining that said first log file entry and said second log file entry relate to each other and belong to a same action flow;
   based on the determination that said first log file entry and said second log file entry relate to each other and belong to the same action flow, consolidating said first log file entry and said second log file entry into the same action flow; and
   reconstructing an action flow sequence for the same action flow based on said first log file entry and said second log file entry.

2. The method according to claim 1, wherein said characterizing feature set is selected from a group comprising at least one of a timestamp of an entry in a log file, a log entry origin identifier, a log entry target identifier, a log entry purpose value, user information, content data, a network address, a log origin importance value, and a log request identifier.

3. The method according to claim 1, wherein said first log file and said second log file relate to different service programming and/or service executing frameworks.

4. The method according to claim 1, wherein said classifying of said relationship of said first log file entry and said second log file entry is performed by a first machine-learning system that generates a model for classifying log file entries.

5. The method according to claim 1, wherein, for at least a subset of corresponding features of said characterizing feature sets of said first log entry and said second log entry, a numerical score value is determined.

6. The method according to claim 5, comprising:
   determining said correlation factor value by determining a difference between a weighted sum of said subset of corresponding features of said first log entry and a weighted sum of said subset of corresponding features of said second log entry based on the numerical score value.

7. The method according to claim 6, comprising:
   using a second machine-learning system for generating models for determining tags, each model characterizing a log file entry of said first log file and said second log file based on a usability factor for each feature of a log file entry.

8. The method according to claim 1, wherein said action flow is a sequence of correlated and activated services comprising a contextual correlation.

9. The method according to claim 1, comprising:
   generating a result log comprising said first log file entries and said second log file entries relating to each other and belonging to said same action flow.

10. The method according to claim 2, comprising:
    extracting said content data from a log entry;
    requesting originating requestor identifier from a plurality of search engines for a predefined time window associated with said log entry related to said content data; and
    generating a universal request identifier relating to log file entries for which said content data and said originating requestor identifiers match.

11. The method according to claim 10, wherein said determination of said correlation factor value comprises a function of said universal request identifier indicating a relationship between related log file entries.

12. A log consolidation engine system for a consolidation of log file entries, said system comprising:
    a receiving unit for receiving a first log file and a second log file;
    a first determination unit for determining a first characterizing feature set of a first log file entry of said first log file and a second characterizing feature set of a second log file entry of said second log file;
    a second determination unit for determining a correlation factor value of a correlation between said first log file entry and said second log file entry by a classification of a relationship of said first log file entry and said second log file entry using said characterizing feature sets;
    wherein in response to determining that said correlation factor value is above a predetermined correlation factor threshold value, said second determination unit determines that said first log file entry and said second log file entry relate to each other and belong to a same action flow;
    wherein based on the determination that said first log file entry and said second log file entry relate to each other and belong to the same action flow, said second determination unit consolidates said first log file entry and said second log file entry into the same action flow; and
    wherein said second determination unit reconstructs an action flow sequence for the same action flow based on said first log file entry and said second log file entry.

13. The system according to claim 12, wherein said characterizing feature set is selected from a group comprising at least one of a timestamp of an entry in a log file, a log entry origin identifier, a log entry target identifier, a log entry purpose value, user information, content data, a network address, a log origin importance value, and a log request identifier.

14. The system according to claim 12, wherein said first log file and said second log file relate to different service programming and/or service executing frameworks.

15. The system according to claim 12, comprising:
    a first machine-learning system for classifying said relationship of said first log file entry and said second log file entry, wherein said first machine-learning system generates a model for classifying log file entries.

16. The system according to claim 12, wherein said first determination unit determines a numerical score value for at least a subset of corresponding features of said characterizing feature sets of said first log entry and said second log entry.

17. The system according to claim 12, wherein said second determination unit determines said correlation factor value by determining a difference between a weighted sum of said subset of corresponding features of said first log entry and a weighted sum of said subset of corresponding features of said second log entry based on the numerical score value.

18. The system according to claim 17, comprising:
a second machine-learning system trained for generating models for determining tags, each model characterizing a log file entry of said first log file or said second log file based on a usability factor for each feature of a log file entry.

19. The system according to claim 12, comprising:
an extraction unit for extracting said content data from a log entry;
a requesting unit for requesting originating requestor identifier from a plurality of search engines for a predefined time window associated with said log entry related to said content data; and
a generator unit for generating a universal request identifier relating to log file entries for which said content data and said originating requestor identifiers match.

20. A computer program product for consolidating log file entries, said computer program product comprising a computer readable storage medium having program instructions embodied therewith, said program instructions being executable by one or more computing systems or controllers to cause said one or more computing systems to:
receive a first log file and a second log file;
determine a first characterizing feature set of a first log file entry of said first log file and a second characterizing feature set of a second log file entry of said second log file;
determine a correlation factor value of a correlation between said first log file entry and said second log file entry by classifying a relationship of said first log file entry and said second log file entry using said characterizing feature sets;
in response to determining that said correlation factor value is above a predetermined correlation factor threshold value, determine that said first log file entry and said second log file entry relate to each other and belong to a same action flow;
based on the determination that said first log file entry and said second log file entry relate to each other and belong to the same action flow, consolidating said first log file entry and said second log file entry into the same action flow; and
reconstructing an action flow sequence for the same action flow based on said first log file entry and said second log file entry.

* * * * *